(No Model.) 4 Sheets—Sheet 3.
N. N. HORTON.
BICYCLE.
No. 436,239. Patented Sept. 9, 1890.
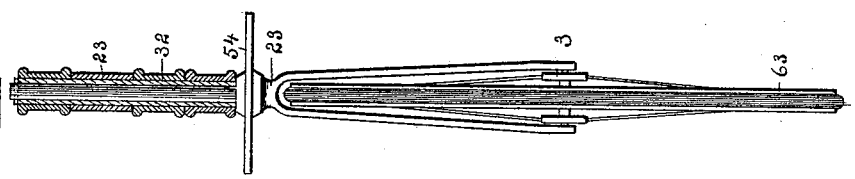
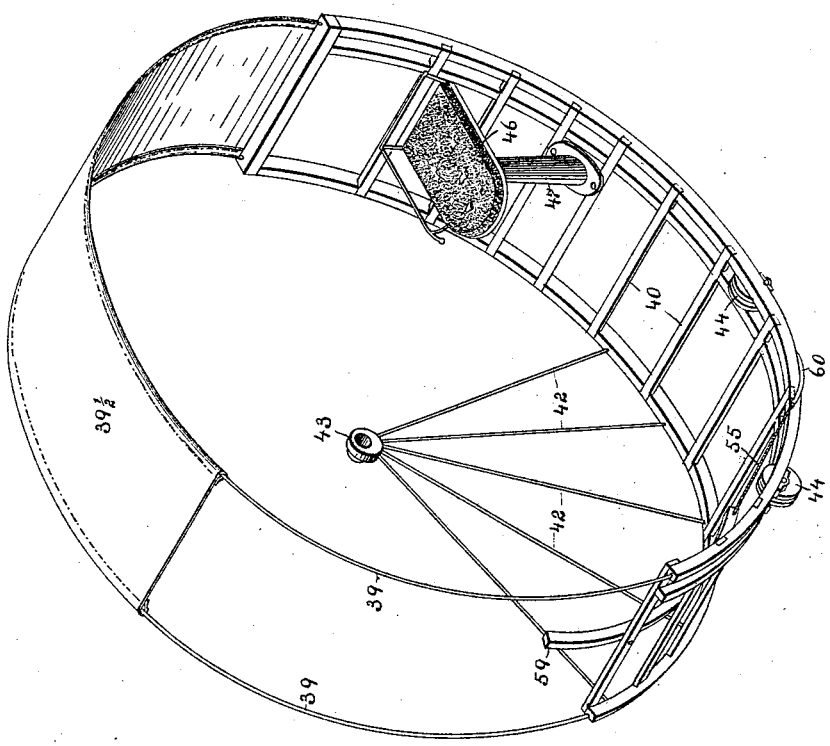
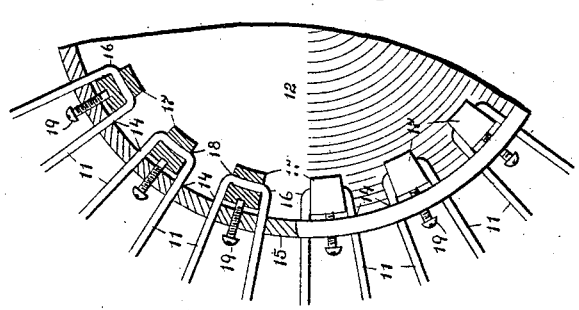
Witnesses:
F. G. Fischer
L. Rickes
Inventor:
N. N. Horton,
By Knight Bros.
Attys.

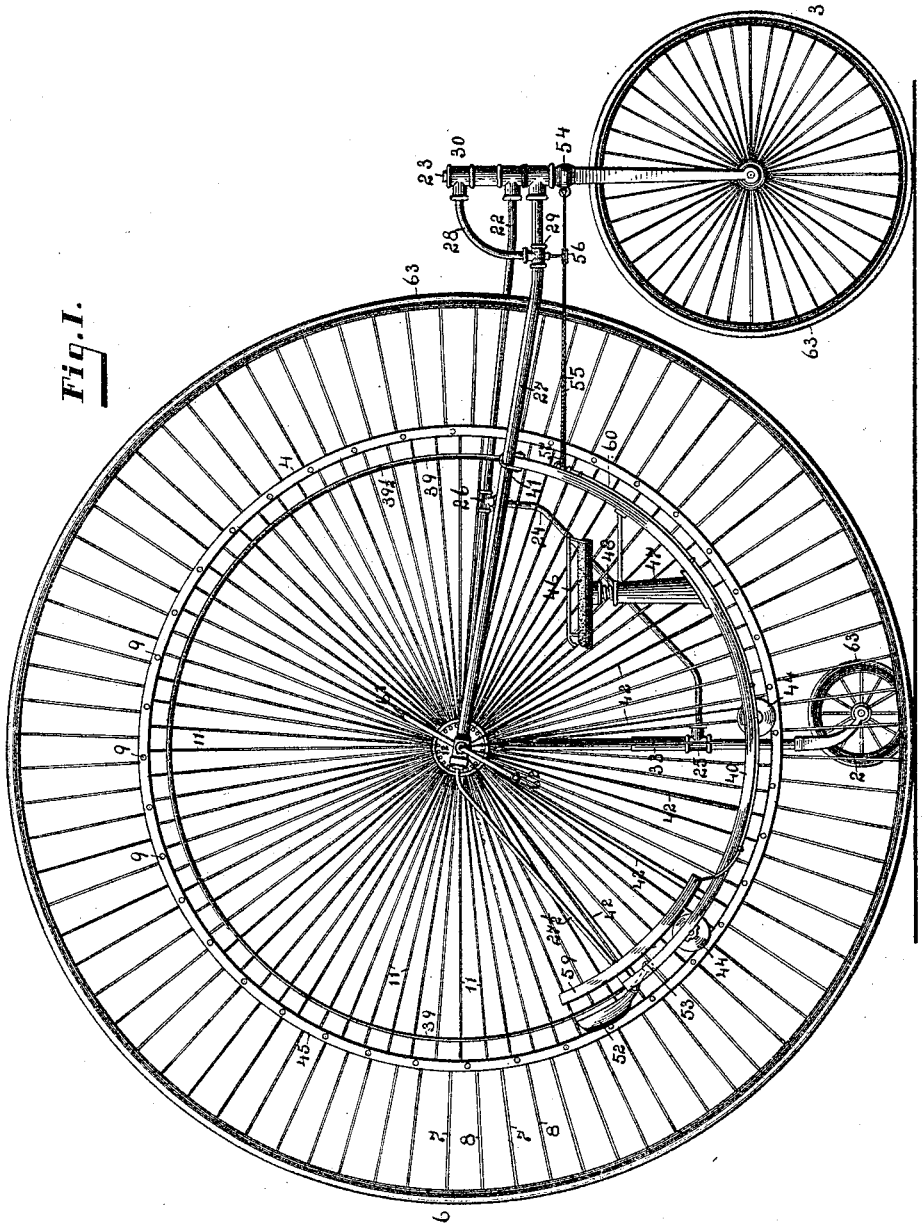

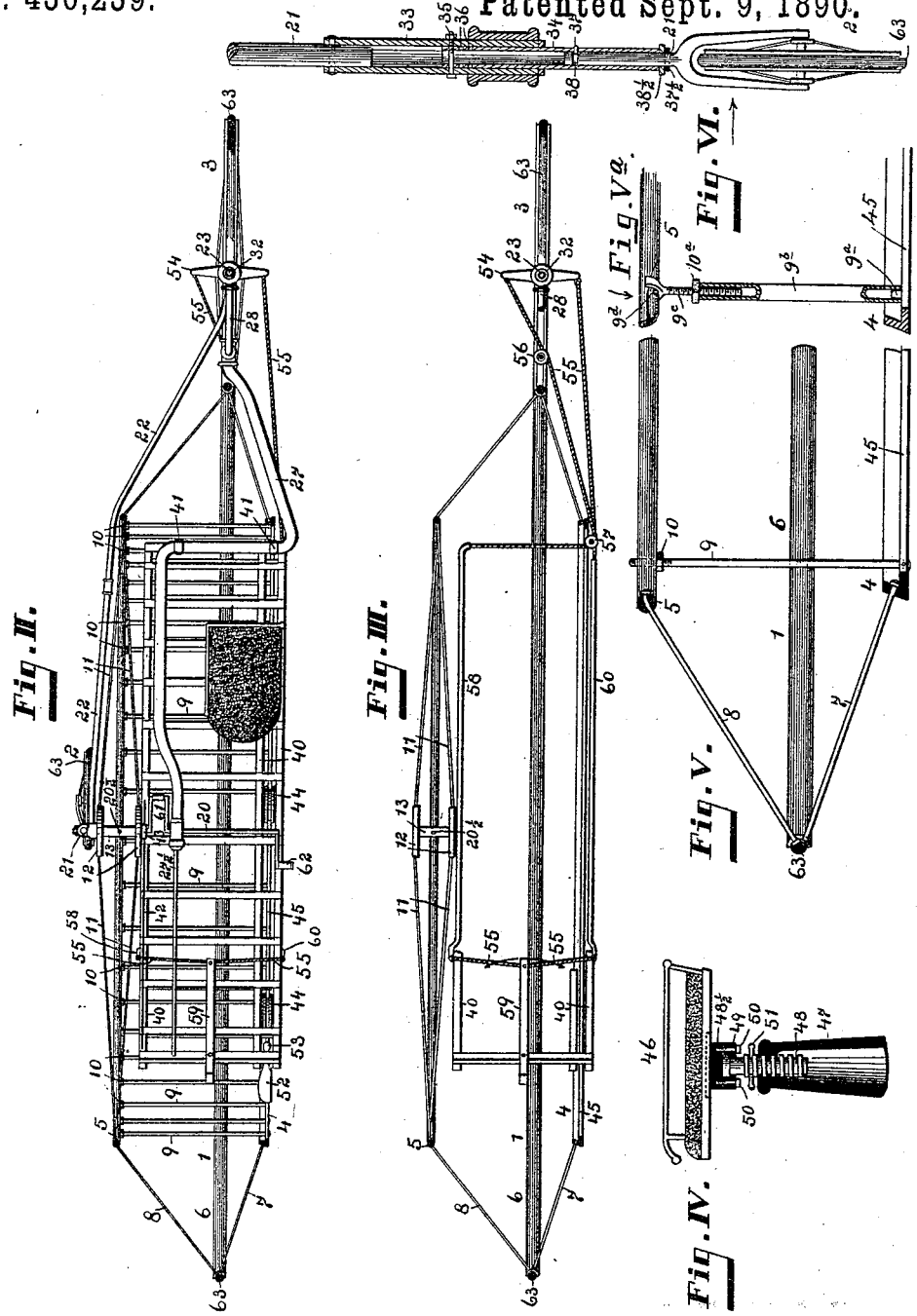

(No Model.) 4 Sheets—Sheet 4.
N. N. HORTON.
BICYCLE.
No. 436,239. Patented Sept. 9, 1890.
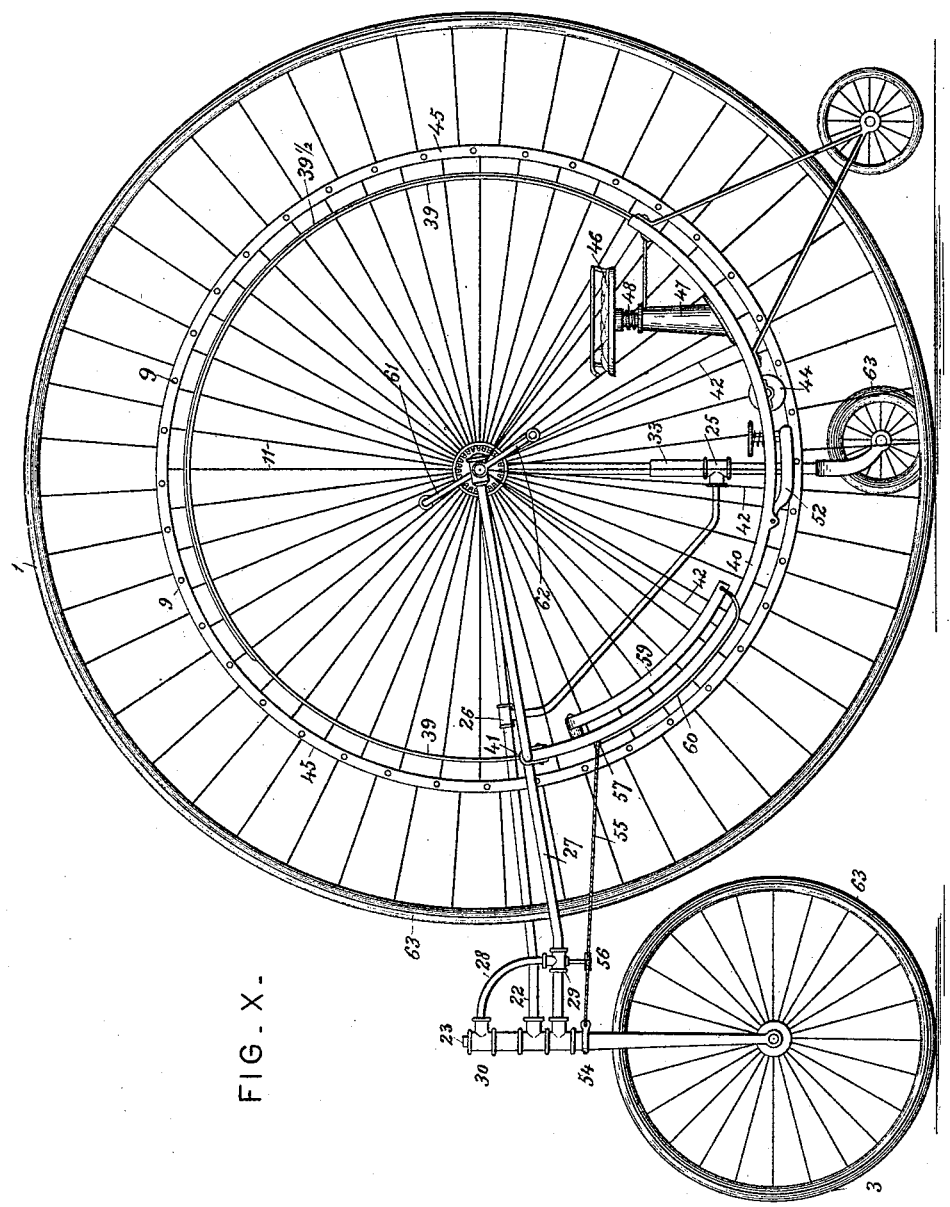
FIG. X.
Attest:
Geo. T. Smallwood.
Samuel H. Knight.
Inventor:
N. N. Horton.
By Knight Bro.
Attys

UNITED STATES PATENT OFFICE.

NUMON N. HORTON, OF KANSAS CITY, MISSOURI.

BICYCLE.

SPECIFICATION forming part of Letters Patent No. 436,239, dated September 9, 1890.

Application filed October 25, 1889. Serial No. 328,110. (No model.)

*To all whom it may concern:*

Be it known that I, NUMON N. HORTON, a citizen of the United States, residing at Kansas city, in the county of Jackson and State of Missouri, have invented certain new and useful Improvements in Bicycles, of which the following is a full, clear, and exact description, reference being had to the accompanying drawings, forming a part of this specification.

My invention relates to certain new and useful improvements in bicycles; and my invention consists in features of novelty hereinafter described, and pointed out in the claims.

Figure I is a side elevation of my improved device. Fig. II is a horizontal section of the same. Fig. III is a horizontal section showing the steering apparatus. Fig. IV is an enlarged vertical section of the seat. Fig. V is is an enlarged detail view of the concave wheel. Fig. $V^a$ is a detail view illustrating a modification of the same parts. Fig. VI is an enlarged view of the balance-wheel, showing its adjustable supporting-standard, part in section. Fig. VII is an enlarged detail view of the spoke-tightening device. Fig. VIII is a perspective view of the basket with its various attachments. Fig. IX is an enlarged rear view of the steering-wheel. Fig. X is a side elevation of my improved bicycle arranged with the steering-wheel in front.

Referring to the drawings, 1 represents the driving-wheel; 2, a balance-wheel, which assists in supporting the device while not in use, and 3 a steering-wheel. 4, 5, and 6 represent the several rims of my concave wheel, which are placed in substantially a triangular position, the rims 4 5 being of less diameter than the rim 6, the rim 6 thus being the one on which the bicycle travels. The distances from the rim 6 to the rims 4 5 are not equal, the rim 6 being set nearer to the rim 4 than it is to the rim 5. The rims are secured to each other by means of the tension-spokes 7 8 and the rigid cross-rods 9.

I have shown the spokes riveted to the re respective rims and the cross-rods firmly secured at one of their ends to the rim 4, the other ends of the rods passing through the rim 5. The ends of the rods that pass through the rim 5 are screw-threaded and are pro vided with set-nuts 10. The nuts 10 are located on the inside of the rim and are for the purpose of regulating the rigidity of the concave wheel. By turning the nuts 10 in the proper direction the rims 4 5 are forced farther apart, and thus, when desired, the tension may be increased on the spokes 7 8, if the rims should from any cause become loosened.

When it is preferable on account of lightness to use tubing for the spreaders, as illustrated in Fig. $V^a$, instead of solid rods, I use pins $9^a$ on the endless-track side 45 in the rim 4, over which the end of the hollow rod $9^b$ rests, and in the other end of the hollow rod or spreader I insert a screw-threaded lug or pin $9^c$, engaging by a fork and stud $9^d$ with the rim 5, and on which is fitted a nut $10^a$ for tightening.

To the rim 5 I secure the outer ends of a series of spokes 11. Starting from the rim, every other spoke diverges from the next spoke, the inner ends of the same being adjustably secured to two disks 12 integral with a metal hub 13. The spokes 11 are secured to the disks 12 by passing through holes 14 in flanges 15 on the periphery of the disks. (See Fig. VII.)

Each of the sections of steel wire or other material forming the spokes is passed through one of the holes in the disk and then bent into a U-shaped loop 16, the free end of the wire being returned through another hole in the disk and then secured at its outer end to the rim, as before described. It will thus be seen that each section of wire forms two spokes.

As a means for increasing the tension on the spokes and thus tightening or making the wheel rigid, I provide blocks 17, which are secured to the loops 16 of the spokes by the wire passing through the holes 18 in the same.

In the disks 12 are set-screws 19, said screws bearing against the blocks 17. Thus by the proper manipulation of the screws the blocks may be forced inward, forcing the spokes toward the center of the wheel, and thus maintaining the proper tension on the same.

The particular mode of applying tension to the spokes being applicable to vehicle-wheels in general, I have made it the subject-matter of another application of even date herewith.

The hub 13 has for its spindle the crank-shaft 20, to which it is rigidly secured by a pin 20½. The crank-shaft is suitably journaled at its outer end to the upper end of the supporting-standard 21 of the balance-wheel.

22 represents a brace extending from the top of the standard 21 of the balance-wheel to a standard 23 of the steering-wheel, said brace being so shaped as not to interfere with the operation of the drive-wheel. The braces and frame may be constructed of gas-pipe, if desired, the suitable connection being made by the use of T-joints.

24 represents a cross-brace extending from a point near the center of the standard 21 of the balance-wheel. The cross-brace is connected at its respective ends by means of T-joints 25 26.

27 represents the main supporting-brace, which extends in an irregular line from the standard of the steering-wheel to the center of the drive-wheel, the crank-shaft 20 being journaled in the forward end of the same.

27½ represents a brace connecting the forward end of the brace 27 with the basket.

28 represents a curved brace having one of its ends connected by a T-joint 29 to the main brace 27 near its rear end, the other end of the curved brace being secured by a T-joint 30 to the top of the steering-standard 23.

The braces 22 27 are both connected to the standard 23 by T-joints. The steering-wheel 3 is journaled to the lower end of the bifurcated standard 23. The upper end of the standard is journaled in a sleeve 32, around which are placed the T-joints, to which the rear ends of the braces 22 27 are attached. By the use of this sleeve I avoid the wear on the standards of the T-joints surrounding the same.

To the upper end of the standard 21 of the balance-wheel is secured a sleeve 33. Inside of the sleeve 33 is an adjustable sleeve 34, which may be set at different heights by means of a bolt 35, which passes through the sleeve 33 and through any one of a series of holes 36 in the adjustable sleeve 34.

The lower end of the standard 21 is bifurcated to receive the balance-wheel 2. The standard is secured to the sleeve 34 by a pin 37, secured to the sleeve, which engages in a peripheral slot 38 in the standard, which allows the standard to turn with the wheel, but which prevents it from moving in a vertical direction.

37½ represents a pin through the standard 21, over which is placed a washer 38½, on which the lower end of the sleeve 34 rests, thus taking the strain off of the pin 37.

The standard 21 is made of such a length that when the drive-wheel is upright the balance-wheel will be slightly raised from the ground or surface on which the wheel is traveling, this distance being regulated by means of the adjustable device described.

When the bicycle is idle or running at a very slow speed, (for instance, when it is being put into motion and before it has attained any speed to speak of,) the device will lean over at an angle, resting a portion of its weight on the balance-wheel; but as soon as it has obtained sufficient momentum the drive-wheel will of course become upright, and the balance-wheel will be raised from the surface and held suspended until the rider desires to stop the bicycle, when it comes into action again to support the same.

I will now describe the hanging basket which supports the rider.

39 represents a circular metal frame of slightly-less diameter than the rims 4 5. To this frame is attached a shield 39½, which prevents dirt from the wheel from falling on the rider.

40 represents a crescent-shaped frame secured to one side of the frame 39. The frame or basket 40 is suspended to the bicycle by means of loops 41, which connect the frame 40 with the main brace 27, and by rods 42, which connect the frame 40 with the operating crank-shaft by means of an eccentric 43, to which the upper ends of the rods are secured, said crank-shaft being journaled in the eccentric. As an additional means of support for the basket, I secure friction-pulleys 44 to one side of the same, said friction-pulleys traveling on an endless track 45, which is a part of and integral with the rim 4.

46 represents the adjustable seat, which is secured to the basket by means of a hollow leg 47, in which a screw 48 engages. As there is not sufficient room in the device to rotate the seat when it is desired to raise or lower the same by means of the screw, I provide the upper end of the screw with a flange 48½ and secure the same to the seat by means of a collar 49, through which pass set-screws 50.

51 represents pins attached to the screw convenient to be operated by the hand. By the means described I am enabled to rotate the screw, and thus raise or lower the seat without rotating the body of the seat.

52 represents a brake-shoe pivoted to the forward end of the basket-frame, which may be operated by the foot, said brake being forced into contact with the endless track 45 when it is desired to retard the motion of the bicycle. The brake is provided with a balance-weight 53 or a spring, which holds the brake-shoe out of engagement when the foot has been removed from the same.

54 represents arms secured to the standard of the steering-wheel, to the ends of which are attached suitable cords or wires 55. One of these cords is attached to the outer end of one of the arms, and is held to one side out of the way of the drive-wheel by means of friction-pulleys 56 57, the cord then passing through a pipe 58 (which is secured to the basket) to a point near the forward end of the basket, where it emerges and is secured to one end of a lever 59, the other end of the lever being pivoted to the basket-frame. The other cord is secured to the opposite arm on the steering-standard and passes direct to the lever 59 through a pipe 60. By pressing the foot against the side of the lever 59, and thus pulling the cord, the steering-wheel may be turned in the direction desired.

61 62 represent handles on the crank-shaft by which the rider operates the bicycle.

63 represents rubber tires on the wheels; but I do not confine myself to their use, as metal or other material may be used, if desired.

I have shown means for operating the bicycle by hand-power; but I do not confine myself to this special means, for, if found expedient, foot, steam, or other power may be used.

By placing the steering-wheel in front, as illustrated in Fig. X, more of the weight is thrown on the axle.

I claim as my invention—

1. In a bicycle, the combination of the hub 13, outer rim 6, inner concentric rims 4 5, said rims being arranged substantially in the form of a triangle and rim 4 being entirely free of spokes or other obstructions within, suitable spokes for connecting the hub with the inner rim 5, and suitable means for connecting the rims to each other, substantially as described, and for the purpose set forth.

2. As a new article of manufacture, a concave wheel formed of the rims 4, 5, and 6, arranged substantially in the form of a triangle, tension-spokes connecting the outer rim with each of the inner rims, and adjusting spreaders for spreading the inner rims in a lateral direction, substantially as described, and for the purpose set forth.

3. As a new article of manufacture, a concave wheel formed of the rims 4, 5, and 6, arranged substantially in the form of a triangle, tension-spokes connecting the outer rim with each of the inner rims, and rigid rods having one of their ends fixed to one of the inner rims and having set-nuts on the other ends of the rods for the purpose of spreading the inner rims and tightening the tension-spokes, substantially as described, and for the purpose set forth.

4. As a new article of manufacture, a wheel formed of the rims 4, 5, and 6, arranged substantially in a triangle, tension-spokes connecting the outer rim with each of the inner rims, means for spreading the inner rims in a lateral direction, hub 13, tension-spokes connecting the hub with one of the inner rims, and means for increasing the tension of said spokes, substantially as described, and for the purpose set forth.

5. As a new article of manufacture, a wheel formed of the rims 4, 5, and 6, arranged in substantially a triangle, means for suitably connecting said rims with each other, a central hub having disks 12, flanges 15 on the disks having openings 14, tension-spokes passing through the holes in the disks and having their ends secured to one of the inner rims, loops 16 in the spokes, blocks 17, secured to the loops, and set-screws 19 in engagement with said blocks for the purpose of increasing or decreasing the tension on said spokes, substantially as described, and for the purpose set forth.

6. In a bicycle, the combination of a concave wheel having rims 4 5 6, of which rim 6 is the greater in diameter, said rims being arranged substantially in a triangle, hub 13, spokes connecting the concave wheel with the hub, and a crank-shaft to which the hub is rigidly secured, substantially as described, and for the purpose set forth.

7. In a bicycle, the combination of the concave wheel, hub 13, spokes connecting the concave wheel with the hub, crank-shaft to which the hub is rigidly secured, and a suitable frame connecting the crank-shaft with a steering-wheel at about midway of the shaft for affording a support therefor, substantially as described, and for the purpose set forth.

8. In a bicycle, the combination of the drive-wheel, means for rotating the same, braces 22 27, connecting the drive-wheel with a steering-wheel, a standard to which the steering-wheel is journaled, a sleeve 32 on the standard, and T-joints surrounding the sleeve to which the various braces are secured, substantially as described, and for the purpose set forth.

9. In a bicycle, the combination of the drive-wheel, a balance-wheel located to one side of the drive-wheel, a standard 21, to which the balance-wheel is journaled, adjustable sleeve 34 of the standard-pin 37, secured to the adjustable sleeve and engaging in a slot 38 in the part 21 of the standard, and a pin 37½ in the standard on which the sleeve 34 rests, substantially as described, and for the purpose set forth.

10. In a bicycle, the combination of the drive-wheel and a suitable open-sided concave carrying-basket suspended within the same concentrically with the periphery of the wheel, substantially as described, and for the purpose set forth.

11. In a bicycle, the combination of the drive-wheel, crank-shaft secured to the hub of the wheel, brace 27, connecting the crank-shaft with a steering-wheel, and a basket suspended to the brace 27 and the crank-shaft, substantially as described, and for the purpose set forth.

12. In a bicycle, the combination of the frame 39, the frame 40, secured thereto, the rods 42, secured to an eccentric 43, said eccentric secured on the crank-shaft, and loops 41 for securing the frame to the brace 27, substantially as described, and for the purpose set forth.

13. In a bicycle, the combination of the frame 39, frame 40, and a screen 39½, attached to the frame 39, substantially as described, and for the purpose set forth.

14. As a new article of manufacture, a seat having a seat portion, a screw-threaded leg, and a screw having swivel-connection with said seat portion, substantially as described, and for the purpose set forth.

15. In a bicycle, the combination of a seat-top 46, screw-threaded leg 47, screw 48, flange 48½ on the screw, collar 49 in engagement with the flange, set-screws 50 for connecting the flange with the top of the seat, and pins 51 on the screw for the purpose of rotating the same, substantially as described, and for the purpose set forth.

16. In a bicycle, the combination of the drive-wheel, a concave basket suspended within the same, and means in connection with said basket for changing the direction of the steering-wheel, substantially as described, and for the purpose set forth.

17. In a bicycle, the combination of the drive-wheel, basket suspended within the wheel, lever 59, pivoted to the basket, and a cord secured to the lever, said cord passing through tubes 58 60 and having its rear ends secured to arms 54 on the standard of the steering-wheel, substantially as described, and for the purpose set forth.

18. In a bicycle, the combination of the drive-wheel, basket suspended within the wheel, endless track 45 on the wheel, and a brake 52, pivoted to the basket, which may be pressed into engagement with the endless track, substantially as described, and for the purpose set forth.

NUMON N. HORTON.

Witnesses:
OCTAVIUS KNIGHT,
HERVEY S. KNIGHT.